June 21, 1949.　　　C. A. DIMMOCK, JR　　　2,474,041
APPARATUS FOR SCRIBING CIRCLES
ON CYLINDRICAL MEMBERS
Filed Oct. 22, 1947

INVENTOR.
Charles A. Dimmock Jr.
BY
Attorney

Patented June 21, 1949

2,474,041

UNITED STATES PATENT OFFICE 2,474,041

APPARATUS FOR SCRIBING CIRCLES ON CYLINDRICAL MEMBERS

Charles A. Dimmock, Jr., Springfield, Mass.

Application October 22, 1947, Serial No. 781,318

2 Claims. (Cl. 33—21)

1

This invention relates to improvements in scribers.

The principal objects of this invention are directed to the provision of a scriber device which is constructed and arranged to scribe circles and arcs of circles on surfaces which are non-flat or are not in the same plane throughout the area on which a circle is to be scribed.

The device is adapted for numerous and various uses but is particularly adapted for scribing a circle on the surface of a cylinder or the like.

Where a round hole is to be cut in the side of a pipe which is to receive a round pipe, it is necessary to lay out the hole by means of projection which is time consuming and difficult.

By means of this invention, the hole may be easily and quickly scribed on a cylindrical surface.

Figure 1:
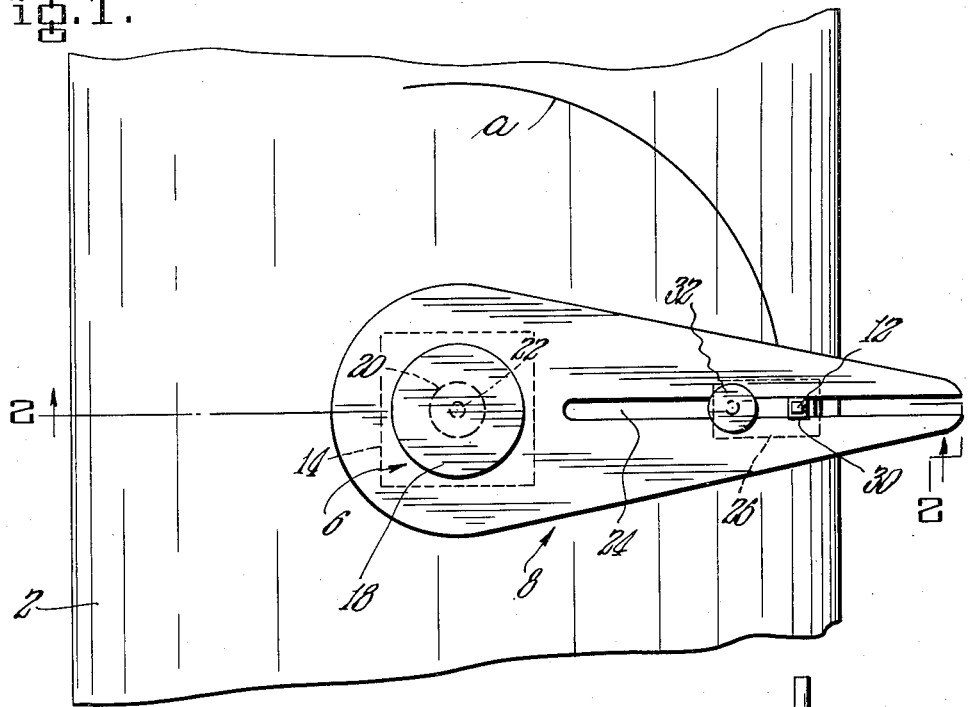
Figure 2:
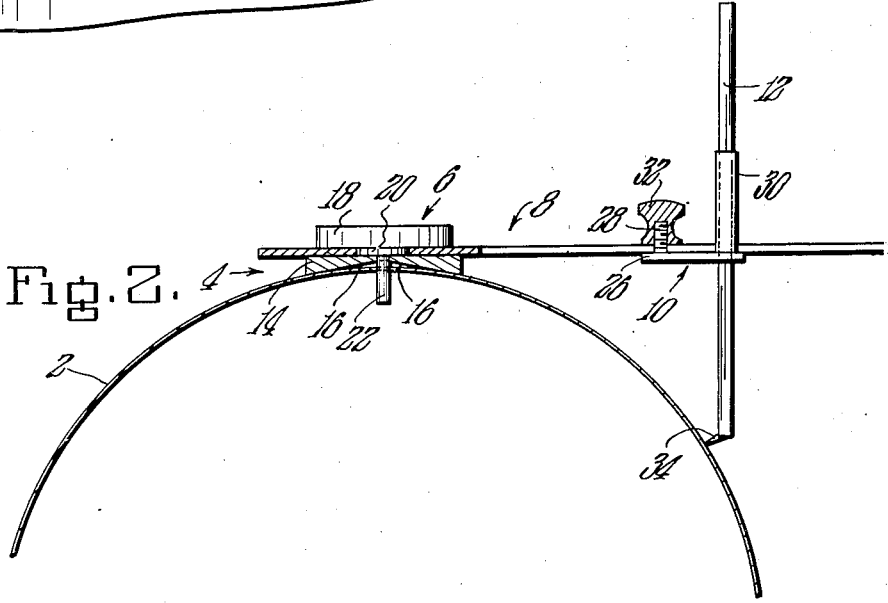

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a plan view of the scriber device of the invention shown in association with a pipe; and Fig. 2 is a sectional view on the line 2—2 of Fig. 1.

Referring now to the drawings more in detail, the invention will be fully described.

In the drawing, a pipe 2 is shown for the purpose of explaining one use for the scriber of the invention. It is common practice to join one pipe to another with the axes thereof at various relative angles and it is necessary to scribe one of the pipes in order to cut a hole for the other pipe.

It will be assumed that it is desired to scribe a pipe 2 to enable the cutting of a hole for another pipe the axis of which is to be at right angles to the axis of said pipe 2.

The scriber of the invention includes in general a support 4, journal member 6, swingable arm 8, guide 10 and scriber 12.

The support 4 is in the form of a plate 14 having relatively angular under faces 16 for engaging a cylindrical surface such as that of pipe 2.

The journal member 6 has a head 18, a journal portion 20 thereunder and a pilot 22 extending therefrom.

2

The arm 8 has a hole which receives the portion 20 of the journal member 6 as shown, and is provided with a longitudinal slot 24 disposed radially of the axis of the hole referred to.

The guide member 10 is provided with a plate 26 which has a threaded stud 28 extending upwardly therefrom. A guide tube 30 also extends upwardly from the plate 26 through the slot 24 and has a square bore therethrough to slidably receive the scriber 12 which is also square in cross section. A nut 32 is in engagement with the stud 28.

The guide member may be moved along the slot of the arm 8 and secured thereto in various positions of adjustment.

The scriber 12 has a stylus 34 at its lower end which extends inwardly therefrom towards the inner end of the arm 8, as shown.

When it is desired to scribe a circle a hole is provided in the object such as pipe 2 for the pilot 22.

The support 4 is placed on the object and with the arm 8 on the pilot part 20 the pilot 22 is inserted through the hole therefor in the member 4 and in the pipe 2.

The guide 10 is secured to the arm 8 so as to locate the stylus 34 at a point from the axis of pilot 22 which will provide the desired radius of circle.

The member 6 is held so that the arm 8 may be rotated on the portion 20 thereof. The scriber 12 is grasped at its upper end and with the stylus in engagement with pipe 2 the arm is swung about pivot 22.

In this way, a circle is scribed on the pipe 2. A part of such a circle is indicated by $a$ in Fig. 1.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Apparatus for scribing on a cylindrical member having a pilot hole disposed at right angles to the longitudinal axis thereof comprising in combination, a support for resting on the cylindrical member having a pilot hole for registering with the pilot hole of the cylindrical member, a journal member having a journal portion on the lower side thereof and a pilot extending downwardly therefrom for insertion through the pilot hole of the support and into the pilot hole of the cylindrical member, said journal portion being disposed concentrically relative to said pilot hole and pilot, an arm journalled on said journal portion of the journal member having an outer free end and provided with a longitudinal slot therethrough radially extending from the longitudinal axis of said journal portion, a guide means slidable along said slot having a hollow longitudinal guideway extending therethrough having a longitudinal axis which is disposed parallel to the longitudinal axis of said journal portion, means for securing said guide member in adjusted positions along said slot, and a scriber reciprocable up and down in said guideway having a lower end for scribing a cylindrical member.

2. Apparatus for scribing on a cylindrical member having a pilot hole disposed at right angles to the longitudinal axis thereof comprising in combination, a support for resting on the cylindrical member having a pilot hole for registering with the pilot hole of the cylindrical member, a journal member having a journal portion on the lower side thereof and a pilot extending downwardly therefrom for insertion through the pilot hole of the support and into the pilot hole of the cylindrical member, said journal portion being disposed concentrically relative to said pilot hole and pilot, an arm journalled on said journal portion of the journal member having an outer free end and provided with a longitudinal slot therethrough radially extending from the longitudinal axis of said journal portion, a guide means slidable along said slot having a hollow longitudinal guideway extending therethrough having a longitudinal axis which is disposed parallel to the longitudinal axis of said journal portion, means for securing said guide member in adjusted positions along said slot, and a scriber reciprocable up and down in said guideway having a lower end for scribing a cylindrical member, said guideway and said scriber being formed whereby the latter is held against turning movements in said guideway.

CHARLES A. DIMMOCK, Jr.

REFERENCES CITED

The following references are of record in the file of this patent:

UNITED STATES PATENTS

| Number | Name | Date |
|--------|------|------|
| 534,061 | Childs | Feb. 12, 1895 |
| 1,286,770 | Rashkovsky | Dec. 3, 1918 |
| 2,063,776 | Wozny | Dec. 8, 1936 |
| 2,345,367 | Thorne | Mar. 28, 1944 |
| 2,397,109 | Hedin | Mar. 26, 1946 |

OTHER REFERENCES

Goddard "Peculiar Curved-Surface Intersections Scribed Easily," p. 144, American Machinist Magazine, September 12, 1946.